United States Patent
Siebigteroth et al.

(10) Patent No.: US 8,701,517 B2
(45) Date of Patent: Apr. 22, 2014

(54) METHOD OF GEAR SHIFTING A DUAL CLUTCH TRANSMISSION

(75) Inventors: Marco Siebigteroth, Hennef (DE); Klaus Luig, Bremen (DE); Axel Prenger-Berninghoff, Erkelenz (DE)

(73) Assignee: Getrag Ford Transmissions, Cologne, DE (US)

( * ) Notice: Subject to any disclaimer, the term of this patent is extended or adjusted under 35 U.S.C. 154(b) by 357 days.

(21) Appl. No.: 13/095,392

(22) Filed: Apr. 27, 2011

(65) Prior Publication Data

US 2011/0259134 A1 Oct. 27, 2011

(30) Foreign Application Priority Data

Apr. 27, 2010 (DE) .......................... 10 2010 018 532

(51) Int. Cl.
*F16H 3/38* (2006.01)
*F16H 59/00* (2006.01)

(52) U.S. Cl.
USPC .............................................. 74/340; 74/335

(58) Field of Classification Search
USPC ............ 74/325, 335, 340, 664, 665 R, 665 A, 74/665 B, 665 G; 477/169, 176, 181, 70
See application file for complete search history.

(56) References Cited

U.S. PATENT DOCUMENTS

| | | | | |
|---|---|---|---|---|
| 5,407,401 | A * | 4/1995 | Bullmer et al. | 477/110 |
| 6,679,134 | B2 * | 1/2004 | Shigyo | 74/336 R |
| 6,698,304 | B2 * | 3/2004 | Gierling et al. | 74/340 |
| 6,712,734 | B1 * | 3/2004 | Loeffler | 477/5 |
| 6,881,171 | B2 * | 4/2005 | Kuhstrebe et al. | 477/78 |
| 6,978,691 | B2 * | 12/2005 | Katakura | 74/331 |
| 7,080,569 | B2 * | 7/2006 | Preisner et al. | 74/337 |
| 7,094,176 | B2 * | 8/2006 | Budal et al. | 477/5 |
| 7,840,329 | B2 * | 11/2010 | Katakura et al. | 701/61 |
| 7,993,241 | B2 * | 8/2011 | Schaarschmidt et al. | 477/80 |
| 8,050,830 | B2 * | 11/2011 | Komeda et al. | 701/51 |
| 8,079,936 | B2 * | 12/2011 | MacFarlane et al. | 477/109 |
| 8,177,685 | B2 * | 5/2012 | Leibbrandt et al. | 477/109 |
| 8,182,388 | B2 * | 5/2012 | Gumpoltsberger | 475/330 |
| 8,251,866 | B2 * | 8/2012 | Kaltenbach | 477/5 |
| 8,360,183 | B2 * | 1/2013 | Sauvlet et al. | 180/65.28 |
| 8,388,497 | B2 * | 3/2013 | Corigliano et al. | 477/110 |
| 8,392,083 | B2 * | 3/2013 | Hodrus et al. | 701/67 |
| 2003/0074992 | A1 | 4/2003 | Gierling et al. | |
| 2005/0064990 | A1 * | 3/2005 | Berger | 477/107 |
| 2007/0287588 | A1 * | 12/2007 | Steinhauser et al. | 477/109 |
| 2010/0006365 | A1 * | 1/2010 | Hasegawa et al. | 180/338 |

FOREIGN PATENT DOCUMENTS

| | | |
|---|---|---|
| DE | 19853824 | 5/2000 |
| DE | 10349220 | 2/2005 |

* cited by examiner

*Primary Examiner* — Troy Chambers
*Assistant Examiner* — Jude Agendia
(74) *Attorney, Agent, or Firm* — Schlee IP International, P.C.; Alexander R. Schlee

(57) ABSTRACT

A method for gear shifting a dual clutch transmission from an initial gear into a target gear and a respective dual clutch transmission are described. The dual clutch transmission comprises a first partial transmission and a second partial transmission. When shifting from an initial gear into a target gear which are both allocated to the first partial transmission, gears are shifted at least for a short time period into the support gear prior to gear shifting from the support gear into the target gear. A process of an uninterrupted reduction of the transmitted clutch torque down to zero at a first clutch allocated to the initial gear is started prior to starting a process of closing the second clutch allocated to the support gear.

13 Claims, 4 Drawing Sheets

METHOD OF GEAR SHIFTING A DUAL CLUTCH TRANSMISSION

CROSS-REFERENCE TO RELATED APPLICATION

This application claims the priority of the German patent DE 102010018532.9 having a filing date of Apr. 27, 2010. The entire content of this prior German patent application DE 102010018532.9 is herewith incorporated by reference.

BACKGROUND OF THE INVENTION

The invention relates to a method for gear shifting a dual clutch transmission.

In the DE 19853824 A1 a dual clutch transmission is disclosed comprising a plurality of gear speeds, in the following also simply referred to as "gears", comprising a first and a second parallel power transmission branch. A first main clutch relates to a first power transmission branch, while a second main clutch relates to a second power transmission branch. Several gear speeds which are also provided adjacent to each other are allocated to one power transmission branch. For avoiding a driving power interruption during the gear shifting between two gears that are both allocated to one and the same power transmission branch the driving power is transmitted during the gear shifting process at least for a short time period via the other power transmission branch.

The DE 103 49 220 relates to a method for gear shifting a dual clutch transmission of a vehicle. During the process of shifting gears from an initial gear into a target gear where both the initial gear and the target gear are allocated to one and the same power transmission path, for avoiding an interruption in the driving power, at least for a short time a support gear is engaged in the respective other power transmission path. Controlling the gear shifting process in the transmission from the initial gear to the target gear is for this purpose performed in that the rotational speed of the motor torque approaches the synchronized rotational speed of the target gear at an almost constant gradient.

The DE 101 51 260 A1 relates to a method for controlling a dual clutch transmission. For achieving a sportive driving performance in case of shifting back two gears on purpose no interruption free power transmission when changing over to the other partial transmission is performed during the downshifting process.

The time needed for gear shifting the dual clutch transmission from an initial gear to a target gear when the target gear and the initial gear are allocated to a joint drive shaft may depend crucially on the time period required for disengaging a gear wheel relating to the initial gear or the time period needed for fixedly connecting a gear wheel that relates to the target gear. Typically, a gear wheel belonging to the target gear can be connected only when the initial gear wheel has already been disengaged. These processes have to be performed inevitably during a gear shifting action from the initial gear to the target gear so that in total the gear shifting process cannot be faster than the time span needed for disengaging the gear wheel relating to the initial gear and for engaging the target gear.

SUMMARY OF THE INVENTION

It is an object of the present invention to provide an enhanced process for gear shifting a dual clutch transmission. This is accomplished by a method for shifting gears in the dual clutch transmission, in particular a dual clutch transmission of a vehicle, wherein the dual clutch transmission comprises two drive shafts and a transmission output shaft, wherein the first drive shaft relates to a first clutch and the second drive shaft relates to a second clutch and both clutches can be opened or closed entirely or in part for transmitting a variety of clutch torques, wherein the first drive shaft and the second drive shaft relate to specific different gear speeds, wherein via the first clutch and via the first drive shaft at least in part a first power transmission path transmitting power from the transmission input shaft to the transmission output shaft is provided and wherein via the second clutch and the second drive shaft at least in part a second power transmission path transmitting power from the transmission input shaft to the transmission output shaft is provided, wherein starting from an initial gear a gear shifting into a target gear is to be performed, wherein prior to gear shifting into the target gear at least for a short time period gear shifting into a support gear is performed when the target gear and the initial gear relate to one and the same drive shaft. A motor torque can be transmitted via at least one of the power transmission paths from the transmission input shaft to the transmission output shaft. According to the present invention, an uninterrupted reduction of the transmitted clutch torque at the clutch that relates to the initial gear down to zero is started before starting the process of closing the clutch that relates to the support gear.

DETAILED DESCRIPTION OF THE INVENTION

The invention relates to such methods for gear shifting a dual clutch transmission wherein gear shifting from an initial gear into a target gear should be accomplished, wherein particularly the target gear and the initial gear are allocated to the same drive shaft. At least for a short time period during the shifting action a shifting of gears into a support gear is performed. During such a gear shifting process, the rotational speed of the motor over time is preferably always geared towards the target gear, meaning that the rotational speed of the motor is accelerated in a substantially constant manner up to the related rotational speed of the motor in the target gear or vice versa decelerated accordingly. In this connection it is particularly provided that the rotational speed of the motor is not remaining on a related rotational speed level that correlates to the rotational speed of the motor in the support gear. In contrast, it is preferable if the graph of the actual rotational speed of the motor over time intersects with the graph of a virtual rotational speed of the motor that correlates to the engaged support gear only at one point in time.

In connection with the invention, the expression "engaging a gear" can be understood in that by means of a claw coupling or other similar devices a gear wheel correlating to a particular gear is fixed to a shaft so that subsequently power can be transmitted via this gear wheel. For engaging the gear it does not matter whether the clutch that is allocated to the specific gear to be engaged is closed so that an actual power transmission from the transmission input shaft to the transmission output shaft via the respective gear wheel can be performed.

The expression "disengaging a gear" is to be understood in connection with the invention specifically in that the respective gear wheel correlating to the respective gear is disengaged from the shaft so that this gear wheel no longer allows any power transmission. In particular the clutch allocated to the gear that is to be disengaged is open during disengaging the gear so that at the time of disengaging the gear wheel from the shaft no power transmission from a transmission input shaft to the transmission output shaft can be performed via the respective gear wheel.

The expression "shifting into a gear" is to be understood in connection with the invention specifically in that the dual clutch transmission is shifted into a specific transmission ratio for the rotational speed from a transmission input shaft to a transmission output shaft. The process of "shifting into a gear" may comprise engaging and disengaging gears as well as opening or closing at least one of the two clutches so that a power transmission path is created from the transmission input shaft to the transmission output shaft.

The expression "closing a clutch" is to be understood in connection with the invention specifically as a process during which the capacity of the clutch to transmit a torque is steadily increased, in particular for the purpose of transmitting a power from the transmission input shaft to a transmission output shaft. A closing can particularly only be achieved at the so-called touchpoint where no play is left between the disks of a multi-disc clutch or a thrusting element and a clutch disk. A filling or a prefilling of the clutch can in particular be provided for bridging or removing a play and is in connection with the present invention not to be understood as "closing a clutch", even if during the prefilling of the clutch a drag torque is transmitted.

The expression "reducing the transmitted clutch torque to zero" is to be understood in connection with the invention specifically in that after reaching the value zero substantially no driving torque is transmitted via the respective clutch. Possible drag torques which can also result in case of an entirely open clutch from friction and flow forces and result to some extent in a continued transmission of torque are in this context negligible.

By starting to reduce the transmitted clutch torque at the clutch that is allocated to the initial gear prior to closing the clutch allocated to the support gear it is possible to optimize the time for the entire gear shifting process irrespective of the point in time when closing the clutches allocated to the support gear starts. Gear shifting into the support gear and therefore the overlapping transition of the torque from the one drive shaft to the other drive shaft is therefore not a necessary part of the gear shifting process that determines the entire duration of the gear shifting process. This allows advancing the point in time for engaging the target gear or gear shifting into the target gear.

If a clutch allocated to the initial gear is closed, the gear wheel relating to the initial gear cannot be separated from the respective shaft since this gear wheel is still subjected to a load. For this reason, it is first necessary to reduce the load which can be accomplished by the uninterrupted reduction of the transmitted initial gear clutch torque to zero. Put in different words, the clutch relating to the initial gear is opened during this process, preferably as quickly as possible. An "uninterrupted reduction" is to be understood in that the transmitted clutch torque does not comprise any increase in transmitted clutch torque at any point in time. This includes that at a point in time over a short time period an unchanging torque over time is possible. Therefore, the transmitted clutch torque decreases preferably over time at any point in time.

Preferably, the uninterrupted reduction over time is a substantially linear function. This allows a smooth opening of the clutch which has positive effects on the driving performance. A "substantial linear function" includes such functions where at the beginning and the end of the opening process transitional curve characteristics are provided like concave or convex curve parts of the function torque over time.

Preferably, the duration of the uninterrupted reduction of the transmitted clutch torque is controlled dependent on the required time span for engaging and/or filling the clutch of the support gear. In the alternative or in combination therewith the duration of the uninterrupted reduction of the clutch torque is controlled dependent on the required time for disengaging the initial gear and engaging the target gear. By controlling the duration of the uninterrupted reduction process dependent on the aforementioned conditions an increased driving comfort can be accomplished. In this connection, it is particularly possible to increase the duration of the uninterrupted reduction on purpose if depending on other gear shifting conditions that need to be fulfilled a possible decrease in the entire gear shifting process is limited, i.e. if an additional reduction in the uninterrupted reduction process would not win any additional time. The longer the duration of the uninterrupted reduction process takes, the smoother this reduction process is perceived by the driver.

Preferably, when changing from the initial gear into the support gear the process of closing the clutch related to the support gear is not started prior to having opened the clutch related to the initial gear entirely. By this sequence of actions in time the option of interrupting the driving power during gear shifting into the support gear is considered. A driving power interruption that has been implemented on purpose can be perceived by the driver as a sportive driving performance, in particular if this interruption happens as an immediate reaction on a driving command coming from the driver, for instance a gas pedal "kickdown" action.

During the disengaging process of the initial gear and/or during the opening process of the clutch related to the initial gear it is preferable to engage at least temporarily the support gear. By this overlap in time between disengaging the initial gear or opening of the clutch and engaging the support gear it is further possible to time wise optimize the entire gear shifting process.

In a gear shifting from the support gear into the target gear, preferably during the opening process for the clutch related to the support gear the clutch related to the target gear is already in the process of closing. This process correlates substantially to the process in prior art dual clutch transmissions for changing the driving power transmission from one drive shaft to the other drive shaft, allowing to avoid substantially any interruptions in the driving power. Even though it is in the present method generally possible that an interruption in the driving power is accepted at an early point in time of the gear shifting process; at a later point in time during the gear shifting process, in particular during the process of gear shifting from the support gear into the target gear, an interruption in the driving power is not perceived as comfortable by the driver since such driving power interruption does no longer stand in immediate relation to the command from the driver, for instance the kickdown action. To that extent it is advantageous if despite the desired swift gear shifting process in the early process steps a gear shifting free of any driving power interruptions from the support gear into the target gear is performed.

Preferably, only after a request for changing gears is received the process of uninterrupted reduction of the transmitted initial gear clutch torque to zero or the disengaging process for the initial gear is started. Consequently, these actions commence as a reaction on the specific driving commands, namely in particular by kicking down the gas pedal. Further, preferably immediately after receiving a request for shifting gears the uninterrupted reduction of the torque transmitted by the clutch allocated to the initial gear down to zero is started or the disengaging action of the initial gear is started. This allows to advance the point in time when engaging the target gear is finalized. This allows in total to reduce the duration from receiving a request for changing gears up to finalizing engagement of the target gear and therefore reduces in total the duration for the gear shifting process from the initial gear into the target gear. This is in particular the case if the initial gear and the target gear are allocated to one and the same drive shaft.

In the alternative, it is also possible to start the process of uninterrupted reduction of the transmitted clutch torque to zero at the clutch allocated to the target gear prior to receiving a request for changing gears. At the point in time when the request for changing gears is received, the process of torque reduction has then already started.

Preferably, during a sailing mode where the clutches are open immediately after a request for shifting gears has been determined, closing of the clutch related to the support gear is initiated. The "sailing mode" is to be understood as a driving mode when one or two gears are engaged but the respective clutches allocated to the two drive shafts are open. No coupling between the drive motor and the wheels of the vehicle is present in this sailing mode. By closing the clutch relating to the support gear immediately after receiving the request for shifting gears the duration of the entire gear shifting process can be reduced. This may include the time span for accelerating the rotational speed of the motor from the idle-running rotational speed to a particular higher rotational speed during which the support by the support gear can be accomplished without any notable deceleration of the vehicle.

In the following, the invention is discussed in more detail by referring to the drawings.

DETAILED DESCRIPTION OF THE DRAWINGS

Figure 1:
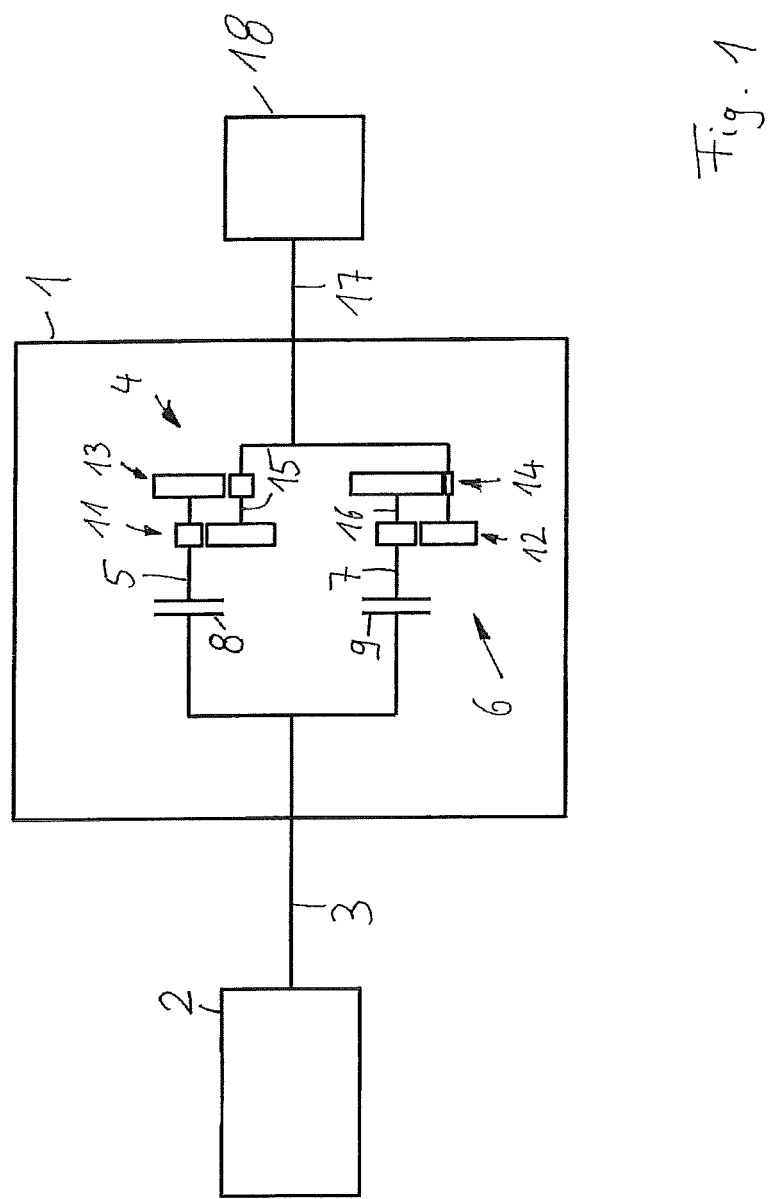
FIG. 1 a schematic structure of a dual clutch transmission for applying the method according to the present invention.

FIG. 1 shows a dual clutch transmission 1 that can be controlled by the method according to the present invention for gear shifting that transmission. The dual clutch transmission is connected via a transmission input shaft 3 with the driving motor 2. The dual clutch transmission comprises a first partial transmission with a first drive shaft 5, wherein the drive shaft 5 is connected via a first clutch 8 with the transmission input shaft 3. Via the first clutch 8 a separation of the driving connection between the drive shaft 5 and the transmission input shaft 3 can be accomplished. Via a first output shaft 15 the first partial transmission 4 is connected with a joint transmission output shaft 17 that can be connected to a differential transmission 18. The first drive shaft 5 as well as the first output shaft 15 are connected to a first pair of gear wheels 11 and a third pair of gear wheels 13. Additional gear wheels can be provided. Via a shifting element that has not been shown in the drawings at least one gear wheel of the first and the third gear wheel pairs can be connected with the drive shaft 4 or disconnected therefrom. Depending on which gear wheel pair the drive shaft as well as the output shaft are fixedly connected to rotate jointly therewith, the respective gear speed is defined that has been engaged in the respective partial transmission.

Additionally, the dual clutch transmission 1 comprises a second partial transmission 6 that is substantially similar to the first partial transmission 4. The second partial transmission 6 comprises a second drive shaft 7 that is connected via a second clutch 9 with the transmission input shaft 3. Via the second clutch 9 a separation of the driving connection between the second drive shaft 7 and the transmission input shaft 3 can be accomplished. Via the second output shaft 16 the second partial transmission 6 can be connected to the joint transmission output shaft 17. The second drive shaft 7 as well as the second output shaft 16 interact with a second gear wheel pair 12 and a forth gear wheel pair 14. Also, additional gear wheel pairs can be provided. Via a non-shown shifting element at least one gear wheel of the second and the fourth gear wheel pairs can be connected with the drive shaft or the output shaft or disengaged therefrom. Depending on which gear wheel pair is connected fixedly to the drive shaft or the output shaft to rotate with the same, the respective gear speed is defined that is established in the respective partial transmission.

When downshifting from the fourth into the second gear, in the initial configuration at first the gear wheels of the fourth gear wheel pair are connected in a fixed manner to the second drive shaft 7 or the second output shaft 16, respectively. Prior to gear shifting into the second gear, first gear shifting into the third gear is performed, wherein the gear wheels of the third gear wheel pair are initially connected in a fixed manner with the first drive shaft 5 and the first output shaft 15, respectively, while the first clutch 8 is initially in its open position. In this configuration, the third gear is engaged. For finally gear shifting into the third gear the first clutch 8 is subsequently closed. The second clutch 9 is then open, so that the fourth gear is turned off. As soon as the second clutch 9 is open, the fourth gear can be disengaged by disengaging one or several gear wheels of the fourth gear wheel pair from the second drive shaft 7 or from the second output shaft 16, respectively. Subsequently, the second gear can be engaged, wherein the gear wheels of the second gear wheel pair are connected in a fixed manner with the second drive shaft 7 and the second output shaft 16, respectively, such as to rotate jointly therewith. When the second gear is established, gear shifting into the second gear can commence by closing the second clutch 9. Synchronously with closing the second clutch 9 the first clutch 8 is opened so that a smooth transition of the torque from the first partial transmission 4 into the second partial transmission 6 is accomplished. Gear shifting from the third gear into the second gear is accomplished without interruption of the driving power.

Figure 2:
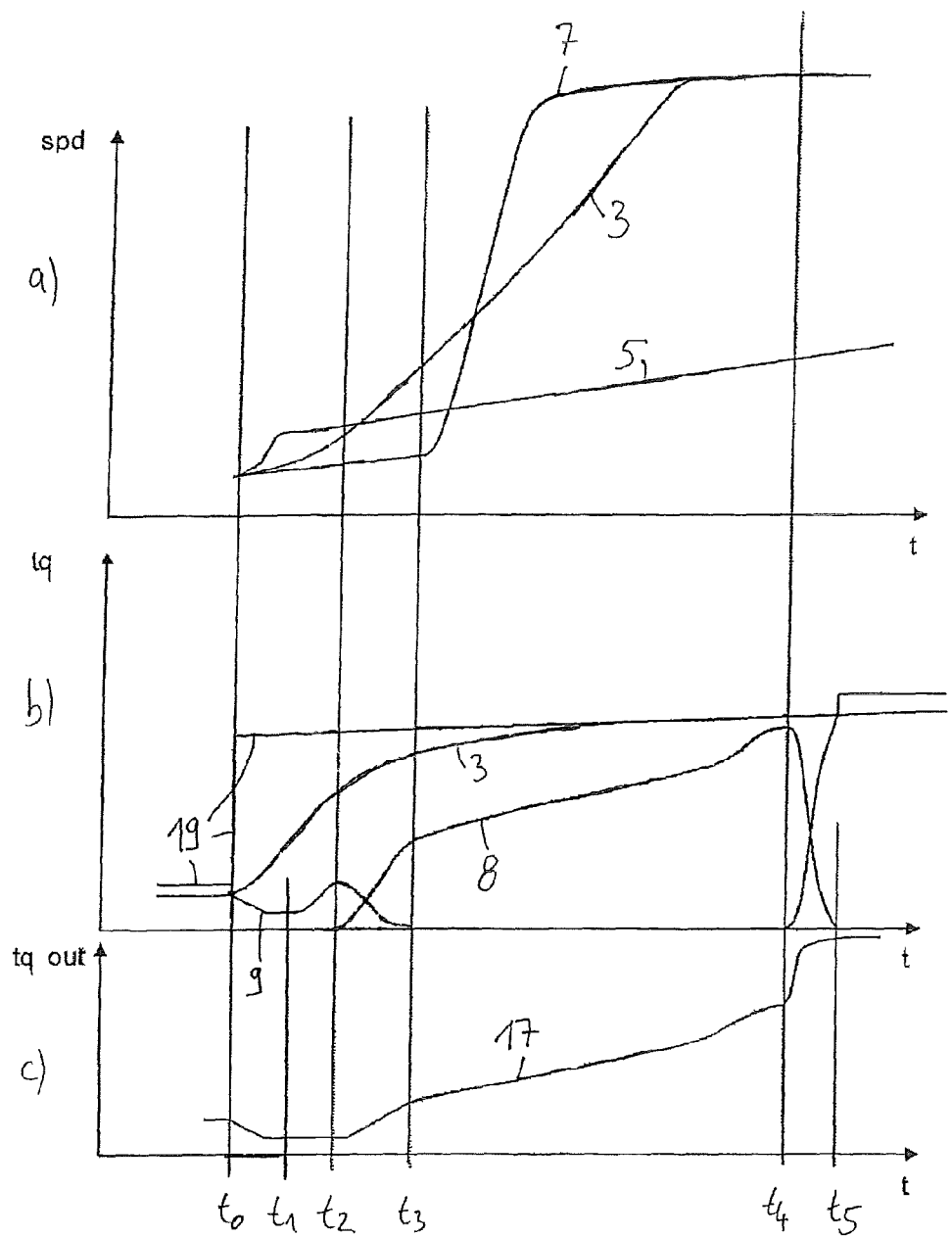
FIG. 2 graphs of a prior art method for downshifting a dual clutch transmission.

Referring to FIG. 2, a known method for downshifting twice in case of a dual clutch transmission is demonstrated, wherein the fourth gear and the second gear are implemented in one and the same partial transmission. The diagrams do, however, also correlate to other downshifting actions wherein the target gear is implemented in one and the same partial transmission as the initial gear from which to the downshifting action is started. FIG. 2a shows the rotational speed of the transmission input shaft 3, the second drive shaft 7 and the first drive shaft 5 over time, wherein the initial gear as well as the target gear are both allocated to the second drive shaft 7 and the support gear to the first drive shaft 5. In FIG. 2b the requested torque 19 is shown over time, wherein this requested torque substantially correlates to the position of a gas pedal. In addition, FIG. 2b shows the torque at the transmission input shaft 3 as well as the second clutch 9, both for the initial starting gear and the target gear, as well as for the first clutch 8 to which the support gear correlates. FIG. 2c shows the torque over time at the transmission output shaft 17.

At a point in time when $t<t_0$ the forth gear is engaged. The vehicle drives with a constant requested torque load and a constant torque at the transmission output shaft 17 with a constant speed. At the point in time $t_0$ the gas pedal is pushed down significantly by the driver so that a steplike significant change in the requested torque 19 results from that action. By increasing this requested torque a separate control unit determines that a gear shifting from the fourth into the second gear is required. In this connection, the control unit determines that the third gear should be used as a support gear. Immediately thereafter the second clutch 9 is opened partially and the motor output torque is increased. This results in an increased rotational speed at the transmission input shaft 3.

In the time span between $t_0$ and $t_2$ the transmission is in a state of adapting the rotational speed during which phase the second clutch 9 is partially open. By increasing the motor torque and reducing the torque transmitted at the second clutch 9 an increase in the rotational speed of the drive motor 2 and therefore an increase in the rotational input speed of the transmission input shaft 3 is generated. In this time span between $t_0$ and $t_1$ the third gear is engaged as a support gear. At the point in time $t_2$ the process of engaging the support gear is finalized. Now the process of closing the first clutch 8 that is assigned to the third gear can start so that a full engagement of the third gear as a support gear is established. In a time period prior to the point in time $t_2$ a slight closing of the second clutch 9 is initiated so that the torque transmitted via the second clutch 9 is increased slightly. In the time span between $t_2$ and $t_3$ torque transmittal is shifted from the second partial transmission 6 to the first partial transmission 4 wherein the second clutch 9 is opened steadily while at the same time the first clutch 8 is closed steadily. When reaching the point in time $t_3$ the second clutch 9 is entirely open and the first clutch 8 is entirely closed. Now, disengaging the fourth gear and engaging the second gear can commence. For disengaging the fourth gear and for final engagement of the second gear the time period between $t_3$ and $t_4$ is required. Only when at the point in time $t_4$ the second gear is engaged entirely, gear shifting into the second gear can be finalized. In this process, the second clutch 9 is closed steadily while the first clutch 8 is opened steadily. During this process, the torque transmittal is shifted from the first partial transmission 4 to the second partial transmission 6 without any interruption in the driving power. At a point in time $t_5$ the second gear is engaged entirely.

Figure 3:
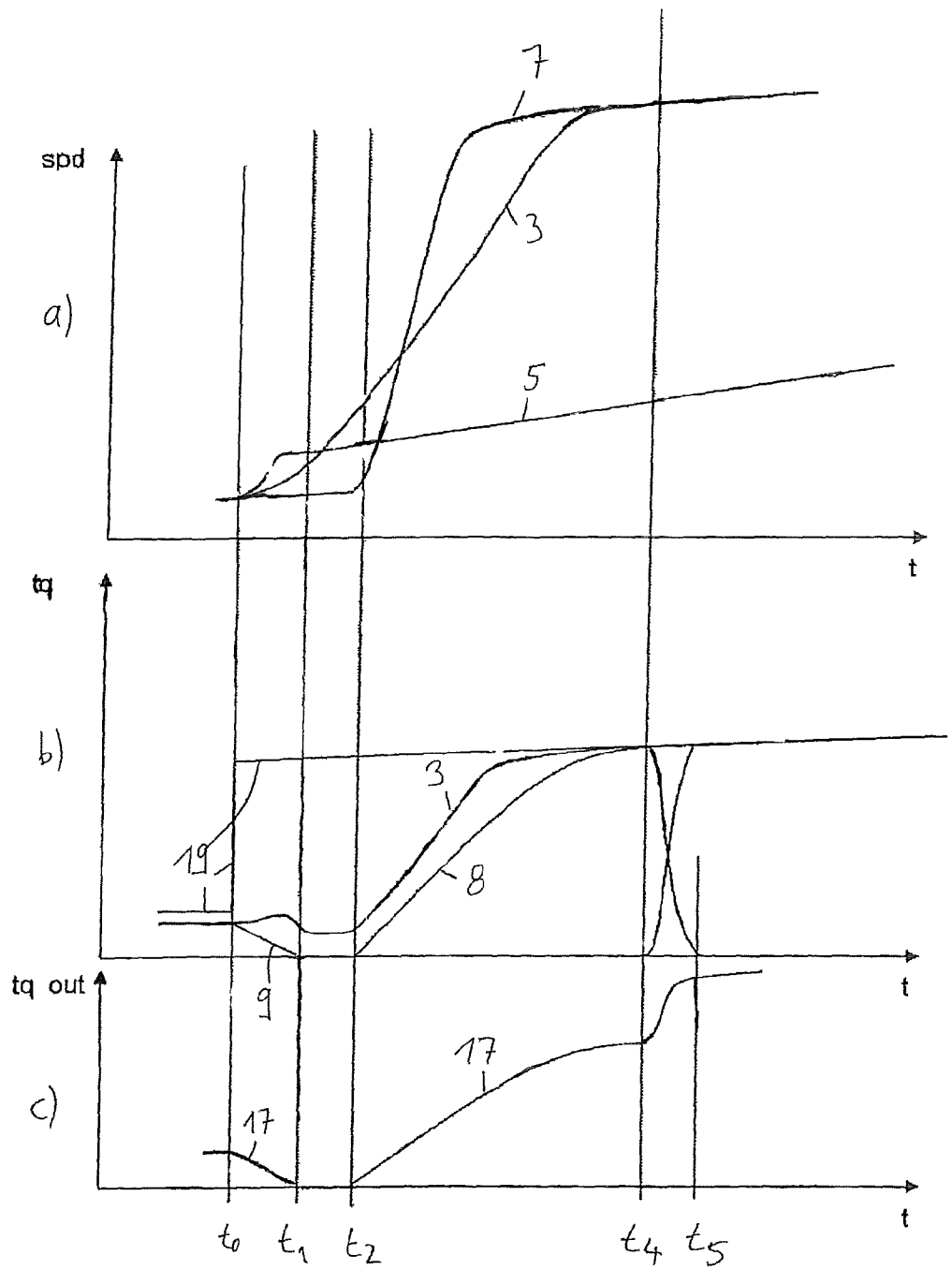
FIG. 3 graphs of the method according to the present invention.

The FIGS. 3a to 3c show the graphs of the rotational speed and the torque over time for the method according to the present invention—which graphs are somewhat similar to the graphs shown in FIG. 2. At a point in time $t_0$ when a steplike increase in the requested torque 19 has been recognized, it is desired to disengage the fourth gear quickly. Since, however, the second clutch 9 relating to the fourth gear is closed initially a steady reduction of the torque at the second clutch 9 is performed. For this purpose, the second clutch 9 is opened entirely during the time span from $t_0$ to $t_1$. Opening of the second clutch is performed in this case at constant rate. No interruption of this opening process is provided. When at the point in time $t_1$ the second clutch 9 has been opened entirely, it is possible to start already with disengaging of the initial gear. Torques that might be transmitted inadvertently by some remaining frictional forces in case of an open clutch are negligible. In soon as the gear wheels of the gear wheel pair 14 have been disengaged from the second drive shaft 7 and respectively from the second output shaft 16 the fourth gear is disengaged and the process of engaging the second gear wheel pair 12 can be started. At the point in time $t_4$ the second gear is engaged entirely. The time period $(t_4-t_1)$ according to the method of the present invention as shown in FIG. 3 correlates to the length in time $(t_4-t_3)$ in a known method according to FIG. 2. Since, however, already at the point in time $t_1$ disengaging the fourth gear wheel pair and therefore disengaging the entire gear speed has commenced, the point in time $t_4$ when the second gear is engaged entirely is reached significantly earlier in relation to the point in time $t_0$. Therefore, a reduction in the time span from recognizing the increased torque request 19 at the point in time $t_0$ when the second gear is fully engaged to the point in time $t_4$ is reduced significantly in the method according to the invention in comparison to the prior art methods.

At the point in time $t_0$ the process of engaging the third gear as a support gear starts immediately. Approximately at the point in time $t_1$ the third gear is engaged. In the time period between $t_1$ and $t_2$ the first clutch 8 is prefilled. At the point in time $t_2$ the first clutch 8 is prefilled so that it is possible to start closing the first clutch. Between the points in time $t_4$ and $t_5$ in analogy to the known method according to FIG. 2 transferring the driving power from the first partial transmission 4 to the second partial transmission 6 is performed so that at the point in time $t_5$ the second gear is fully engaged.

Figure 4:
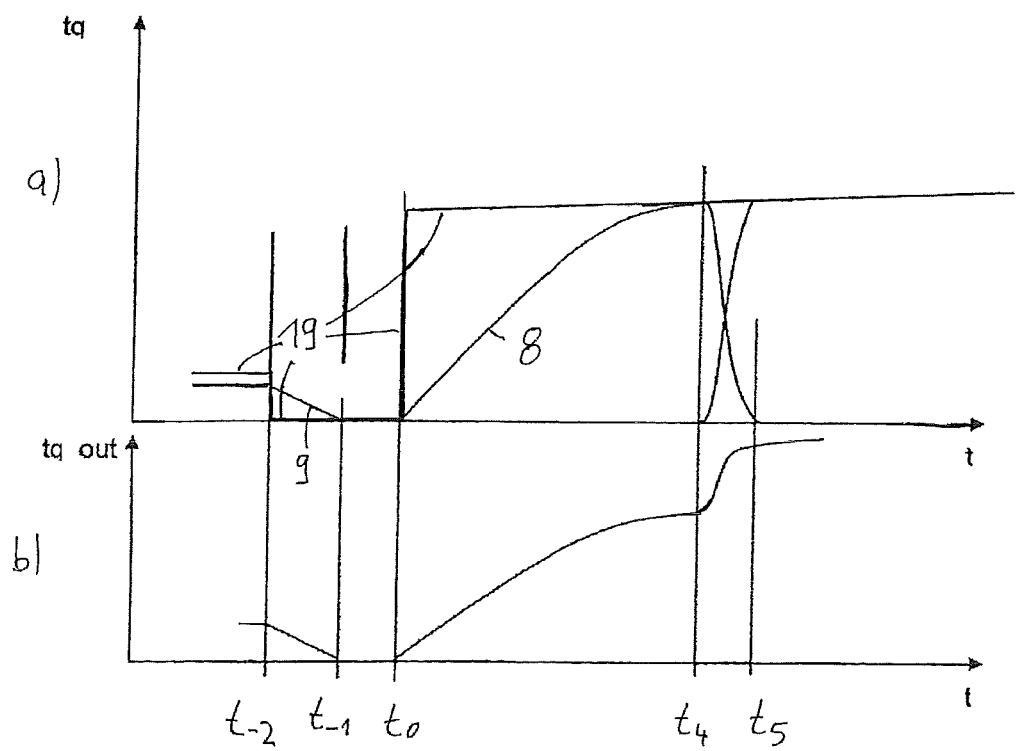
FIG. 4 alternative graphs for an alternative method according to the present invention.

The FIGS. 4a and 4b show the torque over time and correlate in principle with the graphs shown in FIGS. 3b and 3c. In the following, the differences are discussed. During the time period $t < t_{-2}$ the fourth gear is engaged. The requested torque is on a low level and constant. At a point in time $t_{-2}$ the requested torque 19 is reduced to zero which can for instance be accomplished by releasing the gas pedal. During the time period between the points in time $t_{-2}$ and $t_{-1}$ opening the second clutch 9 is carried out wherein the transmitted torque is reduced continuously down to the value zero. At the point in time $t_{-1}$ the second clutch 9 is open. The first clutch 8 is likewise open. During the time period between $t_{-1}$ and $t_0$ a sailing mode at open clutches 8, 9 is established. At the point in time $t_0$ an abrupt high torque request 19 is happening. The control unit determines immediately that gear shifting into the second gear is necessary. At this point in time $t_0$ both the third and the fourth gear are engaged. In general, it would be possible to gear shift at first into the fourth gear. However, for saving time gear shifting is performed immediately into the third gear as a support gear. For this purpose, the first clutch 8 is closed and then gear shifting into the third gear as a support gear is performed. Simultaneously, at the point in time $t_0$ disengaging of the fourth gear and engaging the second gear is started. Since the second clutch 9 is already open, it is possible to start immediately with disengaging the gear wheels relating to the initial gear from the shafts. At the point in time $t_4$ the second gear is engaged entirely. The time span $(t_4-t_2)$ in the process according to FIG. 3 correlates substantially to the time period $(t_4-t_2)$ in the process according to FIG. 2, during which time period disengaging the fourth gear and engaging the second gear is performed. A time advantage is accomplished since at the point in time $t_0$ when the necessity for changing the gear has been determined disengaging the fourth gear starts immediately instead of shifting first into the fourth gear speed. In this case it is advantageous if during the sailing mode the possible support gear is already engaged, in this case the third gear, so that at the point in time $t_0$ it is possible to start shifting immediately into the gear speed of the support gear.

LIST OF REFERENCE NUMERALS 1 dual clutch transmission
2 driving motor
3 transmission input shaft
4 first partial transmission
5 first drive shaft 6 second partial transmission
7 second drive shaft
8 first clutch
9 second clutch
11 first gear wheel pair
12 second gear wheel pair
13 third gear wheel pair
14 fourth gear wheel pair
15 first output shaft
16 second output shaft
17 transmission output shaft
18 differential transmission
19 requested torque

The invention claimed is:

1. A method for gear shifting a dual clutch transmission from an initial gear into a target gear, wherein the dual clutch transmission comprises:
   a first drive shaft;
   a second drive shaft;
   a transmission input shaft;
   a transmission output shaft;
   a first clutch relating to the first drive shaft; and
   a second clutch relating to the second drive shaft; wherein
   the second clutch and the second drive shaft relate to the initial gear and the target gear;
   the first clutch and the first drive shaft relate to a support gear;
   the first and the second clutches can be opened or closed entirely or in part for transmitting a variety of clutch torques;
   via the first clutch and via the first drive shaft at least in part a first power transmission path transmitting power from the transmission input shaft to the transmission output shaft is provided; and
   via the second clutch and the second drive shaft at least in part a second power transmission path transmitting power from the transmission input shaft to the transmission output shaft is provided; the method comprising:
   shifting from the initial gear provided in the second power transmission path to the target gear provided in the same second power transmission path;
   shifting at least for a short time period into the support gear provided in the first power transmission path prior to gear shifting into the target gear; and
   starting a process of an uninterrupted reduction of the transmitted clutch torque at the second clutch down to zero prior to starting a process of closing the first clutch.

2. The method according to claim 1, further comprising reducing the uninterrupted torque as a substantially linear function over time.

3. The method according to claim 1, further comprising controlling the time period for the uninterrupted reduction of the transmitted clutch torque at the second clutch based on the time needed for at least one of engaging the support gear and prefilling of the first clutch.

4. The method according to claim 1, further comprising controlling the time period for the uninterrupted reduction of the transmitted clutch torque at the second clutch based on the time needed for at least one of disengaging the initial gear and engaging the target gear.

5. The method according to claim 1, further comprising starting during a change from the initial gear into the support gear the closing process for the first clutch only after having entirely opened the second clutch.

6. The method according to claim 1, further comprising starting during a change from the initial gear into the support gear the process of disengaging the initial gear prior to starting the process of closing the first clutch.

7. The method according to claim 1, further comprising engaging the support gear at least over a partial time period during the process of at least one of disengaging the initial gear and opening the second clutch.

8. The method according to claim 1, further comprising closing the second clutch during a change from the support gear to the target gear during the process of opening the first clutch.

9. The method according to claim 1, further comprising starting at least one of the uninterrupted reducing of the clutch torque that is transmitted by the second clutch to zero and disengaging of the initial gear after a request for changing the gear is received.

10. The method according to claim 1, further comprising starting immediately at least one of the uninterrupted reducing of the clutch torque that is transmitted by the second clutch to zero and disengaging of the initial gear after a request for changing the gear is received.

11. The method according to claim 1, further comprising starting the uninterrupted reducing of the clutch torque that is transmitted by the second clutch to zero prior to receiving a request for changing the gear is received.

12. The method according to claim 1, further comprising initiating the process of closing the first clutch during the sailing mode and open first and second clutches immediately after a request for changing the gear is determined.

13. Dual clutch transmission comprising:
   a first drive shaft;
   a second drive shaft;
   a transmission input shaft;
   a transmission output shaft;
   a first clutch relating to the first drive shaft;
   a second clutch relating to the second drive shaft; and
   a control for actuating the first and second clutches; wherein
   the second clutch and the second drive shaft relate to an initial gear and a target gear;
   the first clutch and the first drive shaft relate to a support gear;
   the first and the second clutches can be opened or closed entirely or in part for transmitting a variety of clutch torques;
   via the first clutch and via the first drive shaft at least in part a first power transmission path transmitting power from the transmission input shaft to the transmission output shaft is provided; and
   via the second clutch and the second drive shaft at least in part a second power transmission path transmitting power from the transmission input shaft to the transmission output shaft is provided;
   the control is configured to shift from the initial gear provided in the second power transmission path to the target gear provided in the same second power transmission path;
   the control is configured to shift at least for a short time period into the support gear provided in the first power transmission path prior to gear shifting into the target gear; and
   the control is configured to start a process of an uninterrupted reduction of the transmitted clutch torque at the second clutch down to zero prior to starting a process of closing the first clutch.

* * * * *